July 7, 1953  E. G. BRISCOE  2,644,694
ADJUSTABLE MOUNT FOR TOOL BARS
Filed May 27, 1952
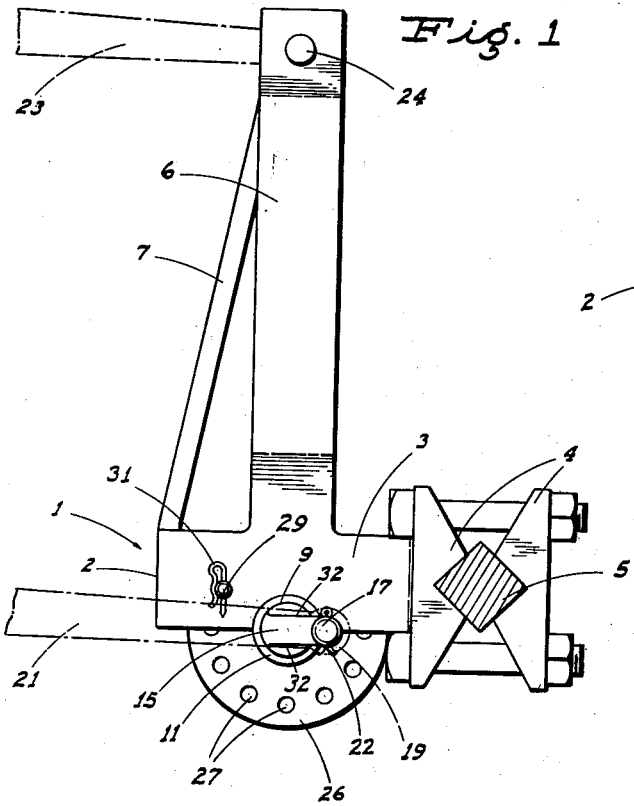
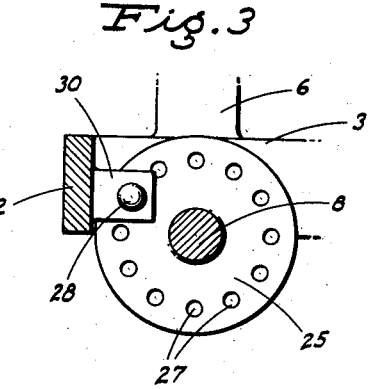
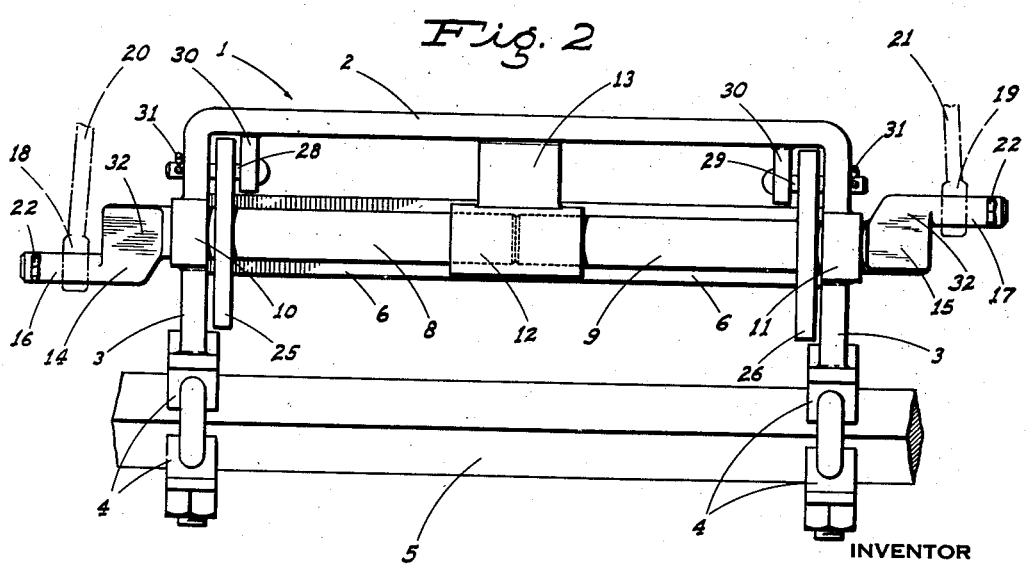
INVENTOR
ELMER G. BRISCOE
BY Webster + Webster
ATTY'S.

Patented July 7, 1953

2,644,694

UNITED STATES PATENT OFFICE 2,644,694

ADJUSTABLE MOUNT FOR TOOL BARS

Elmer G. Briscoe, Fresno, Calif.

Application May 27, 1952, Serial No. 290,205

3 Claims. (Cl. 280—33.44)

The present invention is directed to, and it is a major object to provide, a novel adjustable mount or carrier for attaching a transverse tool bar to the rear of a tractor, especially to a three-point suspension type hitch which includes transversely spaced, lower draft and lift links, and a central, upper compression link.

Another important object of the instant invention is to provide a novel, adjustable mount, for a transverse tool bar, which affords a relatively wide degree of adjustability, for the purpose of setting such tool bar so that earth working implements secured on, and depending therefrom, may trail the tractor in proper alinement, and be leveled both longitudinally and transversely of the direction of travel.

An additional object of this invention is to provide an adjustable mount, for a tool bar, which is arranged for ready and convenient adjustment as varied working conditions may require; the included adjustment cranks being provided with wrench engaging portions to permit of easy manual adjustment—when necessary—of said cranks without the need of other than a conventional type of wrench usually carried on the tractor.

A still further object of the invention is to provide an adjustable mount, for tool bars, which is arranged to permit of selective and independent adjustment of the connection between the mount and each of the transversely spaced lower draft links of the hitch.

It is also an object of the invention to provide an adjustable mount, for tool bars, which is designed for ease and economy of manufacture.

Still another object of the invention is to provide an adjustable mount, for tool bars, which is practical, reliable, and durable; being exceedingly effective for the purpose for which it is designed.

These objects are accomplished by means of such structure and relative arrangement of parts as will fully appear by a perusal of the following specification and claims.

In the drawings:

Fig. 1 is a side elevation of the mount as attached between the tractor hitch and the transverse tool bar.

Fig. 2 is a bottom plan view of the mount.

Fig. 3 is a fragmentary transverse section taken radially through one of the shafts directly inwardly of the corresponding locking disc.

Referring now more particularly to the characters of reference on the drawings, the mount comprises a generally horizontal draft yoke or frame 1 of transversely elongated, U-shape in plan, and opening rearwardly.

The draft yoke or frame 1 includes a front cross bar 2 and rearwardly projecting side bars 3.

The side bars 3 are formed, at their rear ends, with clamps 4 which are attached to—and support—the transverse tool bar, indicated at 5.

The transverse tool bar 5 is adapted for the support, in rigid connection, of earth working implements (not shown) which in one form are plows running below said tool bar and connected thereto by a rigid shank and clamp structure.

An A-frame 6 upstands from the draft frame 1 intermediate the ends of the side bars 3; such A-frame being fixed at the lower end to said side bars, and a diagonal brace 7 extends from the upper end of the A-frame 6 at a forward and downward incline to connection with the center of the front cross bar 2.

A pair of transversely extending, opposed shafts 8 and 9 abut at their inner ends within the confines of the draft frame 1, and thence extend laterally through bearings 10 and 11 carried by the related side bars 3; the inner end portions of the shafts 8 and 9 being turnably supported in a transverse axis sleeve 12 rigidly attached to the front cross bar 2 by a web 13.

Beyond the bearings 10 and 11 the shafts 8 and 9 are formed with cranks, indicated at 14 and 15, respectively; such cranks including crank pins 16 and 17.

The crank pins 16 receive the universal couplings 18 and 19 on the rear ends of the corresponding, transversely spaced, lower draft and lift links 20 and 21 of a three-point suspension, power lift type hitch at the rear of a tractor (not shown).

Couplings 18 and 19 are held against escape by cotter keys 22 or the like which are passed through holes provided in the crank pins 16 and 17 for the purpose.

The upper, central, compression link 23 of the hitch is connected, by the universal coupling conventionally included thereon, to the upper end of the A-frame 6 by means which includes a cross pin 24.

Each of the shafts 8 and 9 is fitted, adjacent but inwardly of the corresponding side bar 3, with a locking disc, indicated at 25 and 26, respectively; each such disc having a concentric row of holes 27 therethrough for the selective reception of a locking pin; such pins being indicated at 28 and 29, respectively.

The forward portion of each disc 25 or 26 runs between the corresponding side bar 3 and a rigid ear 30 which projects rearwardly from the front cross bar 2 laterally inwardly of the disc. The pins 28 and 29, with the headed end inwardly, pass through a hole in the corresponding ear 30, one of the holes 27 in the related locking disc, and thence through a hole in the adjacent side bar 3.

Beyond said side bar each pin is releasably secured in place by a spring clip type securing key 31.

With this arrangement, each of the shafts 8 and 9 may be independently and selectively adjusted so as to position the cranks 14 and 15 as may be best suited to any particular working condition; such cranks being shown in Fig. 2 as adjusted in opposition.

By the proper adjustment of the cranks 14 and 15, the described mount can be set to compensate for side draft resulting from tool engagement in the ground, and can also be set to level the ground engaging implement or implements both lengthwise of the direction of travel and transversely thereof.

In practice the mount can usually be conveniently adjusted as follows:

With the tractor hitch lowered so that the tool bar supported earth working implements are in ground engagement, and with the pins 28 and 29 removed, the tractor is run forwardly a short distance. This permits the cranks 14 and 15 to relatively rotate until the implement has of itself assumed a proper draft position, including leveling. The tractor is then stopped and the pins 28 and 29 are engaged in locking position through the nearest hole 27 of the discs 25 and 26; the mount thus being effectively set for subsequent tillage operations.

Under certain conditions it may be desirable to manually and selectively adjust the cranks 14 and 15, and this is readily accomplished by applying a wrench to the flat portion 32 with which each such crank is formed.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as set forth herein.

Having thus described the invention, the following is claimed as new and useful, and upon which Letters Patent are desired:

1. An adjustable mount, for attachment between a tractor hitch having transversely spaced draft links, and a tool bar; comprising a draft frame, means to secure the tool bar to the draft frame, a pair of oppositely projecting transverse shafts journaled on the draft frame for independent rotation, a crank on the outer end of each shaft adapted for eccentric connection with the corresponding draft link, a locking disc fixed on each shaft adjacent a related part of the draft frame, each disc having a concentric row of holes adapted to register one at a time with a hole in said related part of the draft frame, and a locking pin removably engaged through registering holes in each disc and the related part.

2. An adjustable mount, as in claim 1, in which the inner end portions of the shaft are alined and adjacent each other, a sleeve in which said shaft portions turnably engage in supported relation, and means securing the sleeve to the draft frame.

3. An adjustable mount, for attachment between a tool bar and a tractor hitch having transversely spaced lower draft links and an upper central link; comprising a transversely elongated draft frame of rearwardly opening U-shape, said draft frame including a front cross bar and rearwardly projecting side bars, an A-frame rigid with and upstanding from the draft frame for connection with the rear end of the upper link, a pair of selectively and independently rotatable, transverse shafts end to end within the draft frame extending in journaled relation through corresponding side bars, a central sleve fixed in the draft frame supporting the inner end portions of the shafts, cranks on the outer ends of the shafts for connection with the rear ends of the lower links, a locking disc fixed on each shaft inwardly of but adjacent the related side bar, each disc having a concentric row of holes adapted to register one at a time with a hole in the related side bar, and a locking pin removably engaged through registering holes in each disc and the related side bar.

ELMER G. BRISCOE.

References Cited in the file of this patent

UNITED STATES PATENTS

| Number | Name | Date |
|---|---|---|
| 1,220,261 | Moser | Mar. 27, 1917 |
| 1,315,149 | Paul | Sept. 2, 1919 |
| 1,542,733 | Schulze | June 16, 1925 |
| 2,320,141 | Kott | May 25, 1943 |
| 2,379,225 | Fraga | June 26, 1945 |
| 2,618,211 | Fraga | Nov. 18, 1952 |